Nov. 1, 1927.
J. HERR
1,647,519
BLAST RELEASE AND CONVEYING MEANS
Filed June 24, 1925
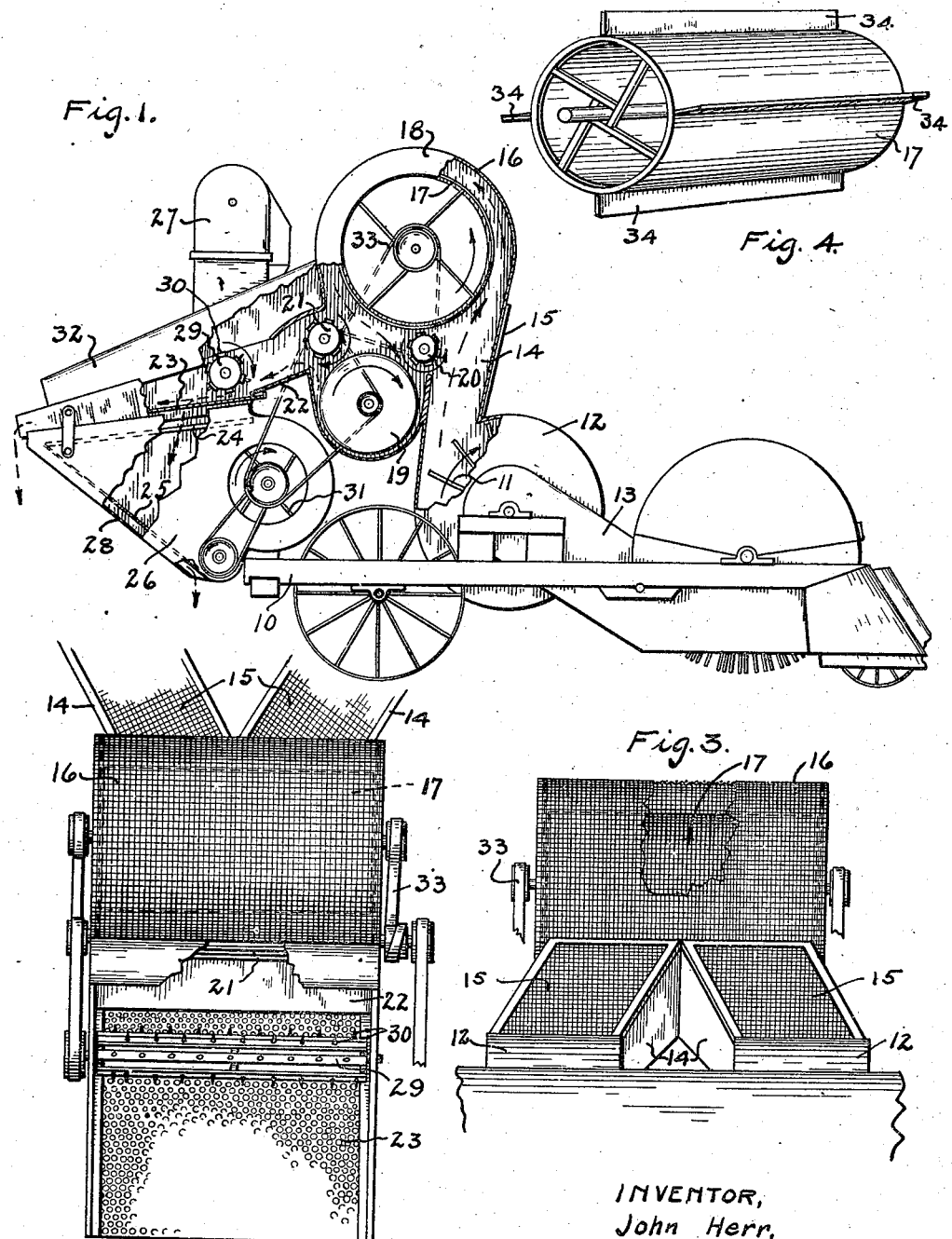
INVENTOR,
John Herr,
By Joseph A. Minturn
Attorney.

Patented Nov. 1, 1927.

1,647,519

UNITED STATES PATENT OFFICE.

JOHN HERR, OF NEAR LEBANON, INDIANA.

BLAST RELEASE AND CONVEYING MEANS.

Application filed June 24, 1925. Serial No. 39,367.

My invention relates for means of relieving the pressure of an air blast in cooperation with means for feeding and passing previously gathered seed and its accompanying chaff and straw through the separator of a combined seed harvester and separator.

The primary object of my invention is to reduce the exhaust pressure of a suction fan which is used to draw in the seed bearing material, whereby such material may be directed and guided from the suction fan through and over proper separating devices without the disturbing influence of the exhaust blast.

Further objects lie in the simplified structure, the positive feeding mechanism operating under all field conditions, the reduction of the blast reducing and feeding mechanism to within a small and compact space, and the consequent cheapened cost of construction as well as the securing of easier and quicker production of the device.

My invention herein described is a critical part of a machine particularly developed to gather the ripened seed from standing or cut clover and grasses directly in the field and to separate the seed from the accompanying refuse in a continuous operation—though the machine may be quickly adapted to gather the larger grains, as wheat, oats, etc.,—without handling any appreciable amount of the straw or stalks, thereby leaving the straw evenly distributed over the field as it grew.

It has been the usual procedure in harvesting clover seed to await the time when an average of the field showed the clover seed to be approaching the ripened stage; then go in and mow it down, gathering it in bunches; then permit the cut clover to ripen in the bunches; and finally, and only at limited periods such as late in the morning after the dew has dried off, to gather up the thoroughly dried clover onto wagons, with the attendant shattering of the seed through the necessary handling; and so haul the clover to a power-operated clover separating machine, wherein the seed was separated and passed into bags and the straw run out onto a stack. Weather conditions had to be exactly right to allow the clover to be neither too damp nor too dry, else there would be a large loss of seed, and as weather conditions can not be controlled, it was only by chance that perfectly favorable conditions were obtained.

My harvester eliminates all such difficulties by being so constructed as to operate over the entire field to gather the ripened seed directly from the standing stems or even from the fallen stems, separating the seed continuously as gathered, thereby eliminating the long-drawn out and tedious operations above described in the old method.

Contributing to the perfect success of the harvester, is my invention, the chief objects of which are above set out, and having such other objects as will be apparent in the following description and the accompanying drawing, in which Fig. 1 is a vertical side elevation of the seed harvester and separator with fragments of the enclosing walls removed to disclose more fully the particular invention herein described; Fig. 2, a top plan view of a portion of the seed harvester and separator; Fig. 3, a front elevation of the blast release mechanism; and Fig. 4, a perspective view of the blast release cylinder in a modified form.

Like characters of reference indicate like parts throughout the several views of the drawing.

Upon a suitable frame 10 mounted on wheels so as to be easily operated over fields, I mount suitable fans 11, two being employed in the present form of my invention, a fragment of one of which fans is shown in Fig. 1, though the number may be varied from one to any desired number to suit the size and requirements of the device. These fans 11, enclosed within the housings 12 have their intake conduits 13 leading from the seed gathering mechanism so as to draw in the seed and accompanying hulls, chaff, and the like, through the fan and to discharge the material so conducted into the blast conduits 14.

In order to gather the seed successfully, a high degree of vacuum or suction is required, and consequently, the fans 11 exhaust air under a considerable blast, which blast if not eliminated would convey the seed on through the separating means and so be partially, if not entirely lost. The problem is to eliminate the blast and still provide means for passing the seed material through the separating means where the seed may be safely separated and gathered up.

I enclose sections of the blast conduits 14 with a fine mesh cover 15, preferably made of wire cloth or screen, of such mesh that the seeds may not pass through. The blast conduits 14 discharge into the cylinder 16 likewise enclosed with the wire cloth. Rotatably and centrally mounted within the cylinder 16 is the inner revolving cylinder 17 having its ends closely approaching the end walls 18 of the cylinder 16. The revolving cylinder 17 is also covered about its circumferential wall by wire cloth, and the ends are left entirely open. The revolving cylinder 17 is of a smaller diameter than that of the cylinder 16 such that quite an appreciable space is permitted therebetween and the blast discharging from the conduits 14 is directed by means of the wire cloth enclosures up, over, and around the revolving cylinder 17 and back toward the point of the conduit discharge, all within the cylinder 16.

The solid arrows, as shown in Fig. 1, indicate the direction in which the various parts of the machine revolve, and the dash-lined arrows indicate the direction of travel of the seed material.

The under side of the cylinder 16 has an opening therein and a separator cylinder 19 is mounted below this opening parallel to and under the revolving cylinder 17 with an appreciable clearance therebetween. A housing closes the space below the separator cylinder 19, following the general periphery of the cylinder 19 with a clearance therebetween. The separator cylinder 19 is mounted in relation to the revolving cylinder 17 such that the material coming around over the revolving cylinder 17 passes under the cylinder 17 and over the separator cylinder 19 and thence down and under the separator cylinder 19. It will be noted that the revolving cylinder 17 and the separator cylinder 19 revolve in opposite directions so as to aid cooperatively in passing the seed material along.

I rotatably mount a stop roller 20 parallel to the separator cylinder 19 and the revolving cylinder 17 along a line approximately at the back edge of the discharge openings of the blast conduits 14, and cause the stop roller 20 to turn in the same direction as that of the revolving cylinder 17, being opposite to that of the separator roller 19. This stop roller 20 is preferably made with a roughened and open surface and I have shown it here as being built up of spaced slats. By the presence of this stop roller 20 as located and so revolving, the blast discharge from the conduits 14 is directed along the line of travel of the revolving cylinder 17, and further, when the same seed material approaches from the opposite side of the roller 20, such material is directed downwardly away from the revolving cylinder 17 and toward the surface of the separating cylinder 19, with gravity aiding.

By the time the seed material has reached the separator cylinder 19, the blast has been practically released, first slightly through the screened closures 15 in the blast conduits 14, further through both the circumferential wall of the cylinder 16 and that of the revolving cylinder 17, but mainly upwardly through the circumferential wall and thence through the open ends of the revolving cylinder 17, along a line immediately above and back of the stop roller 20.

As the seed material is carried around under and discharged upwardly at the rear of the separator cylinder 19, a guide roller 21, revolving in the same direction as that of the separator cylinder 19, directs the seed material backwardly, whereupon the material drops upon an inclined conducting apron 22 so as to convey the seed material down upon the vibrating shaker-screen 23 which is also set at a slight angle to aid the material to pass over it by gravity as the screen is shaken fore and aft in the usual manner in screening devices. The seed drops through the screen 23 onto a lower screen 24 for further separation from weed seeds and the like and thence downwardly onto the inclined hopper bottom 25 to be directed forwardly to a conveyor by which the seed is carried over to one side of the hopper 26 and up into the elevator 27 to be sacked.

While but one lower screen 24 is here shown, any number may be employed. The weed seeds sliding off the screen 24 at the rear are dropped within the space formed by the hopper-bottom 25 and an outer wall 28 such that the weed seeds are carried downwardly and discharged from the under side of the hopper 26, the purpose of such directing means being that a collecting means may be secured at this lower discharge opening to catch the weed seeds and prevent their being returned to the field.

The straw, chaff, and other refuse, not passing through the screen 23 drops off the rear end of the screen 23 directly upon the ground, and as the machine is continually travelling over the field, the material so dropped is left evenly scattered.

To prevent the straw from piling up on the shaker-screen 23 at its upper end, I employ the feed roller 29, which not only keeps the straw and seed material moving, but keeps it evenly distributed by not letting it pile up in bunches before it starts to slide over the screen. I have here shown the roller 29, Fig. 2, to have the same slatted and open construction as that of the other two rollers 20 and 21. Teeth 30 have been added to the roller 29, though under some conditions they are not necessary.

A blower fan 31 is carried at the forward side of the hopper 26 so as to direct a draft upwardly through the screens 23 and 24 to aid in eliminating the particles of refuse from the seed. A cover 32 is placed over the screen 23 to prevent winds from interfering with the separating process.

In Fig. 1, the revolving cylinder 17 is indicated as being positively driven by a belt 33. Under some conditions, this belt may be eliminated and the blast is sufficient to carry the seed bearing material up, over, and around the cylinder 17, the resistance of the revolvable cylinder 17, being so utilized to further reduce the effect of the blast. Under still different conditions, the revolving cylinder 17 as shown in Fig. 4 is employed, carried in the same manner by trunnions to revolve easily, and to which cylinder the fins or wings 34 have been added to aid the blast in revolving the cylinder to aid in carrying the seed bearing material over it, the covering of the cylinder 17 here shown as being non-reticulated, such that the blast would not pass therethrough but through the cylinder 16 and around the cylinder 17 as before described. Under some conditions a non-reticulated covering on cylinder 17 would be advisable for this cylinder, but for the average conditions the reticulated covering as in Fig. 3 gives satisfactory operation.

While I have here shown my invention in the form now best known to me, it is obvious that the structure may be varied considerably and still remain within the spirit of the invention, and I, therefore, do not desire to be limited to the precise structure as shown, nor any more than may be required by the following claims.

I claim:

1. A seed harvester air-blast release device comprising an outer perforate casing open at each end, a revolvable perforate cylinder carried within the outer casing whereby there is an appreciable annular space between the said casing and the cylinder, said revolvable cylinder being open at both ends, said outer casing having an intake opening through which an incoming blast of air carrying seed material is directed tangentially of said revolvable cylinder to cause said seed material to travel circumferentially around the annular space between said casing and the cylinder, and said outer casing also having an opening, in its under side through which the seed material is discharged after travelling up, over and around down through said annular space.

2. A seed harvester air-blast release device comprising an outer perforate casing open at each end, a revolvable perforate cylinder carried within the outer casing whereby there is an appreciable annular space between the said casing and the cylinder, said revolvable cylinder being open at both ends, said outer casing having an intake opening through which an incoming blast of air carrying seed material is directed tangentially of said revolvable cylinder to cause said seed material to travel circumferentially around the annular space between said casing and the cylinder, and said outer casing also having an opening, in its under side through which the seed material is discharged after travelling up, over, and around down through said annular space, and a wall enclosing each end of said annular space.

3. A seed harvester air-blast release device comprising an outer perforate casing open at each end, a revolvable perforate cylinder carried within the outer casing whereby there is an appreciable annular space between the said casing and the cylinder, said revolvable cylinder being open at both ends, said outer casing having an intake opening through which an incoming blast of air carrying seed material is directed tangentially of said revolvable cylinder to cause said seed material to travel circumferentially around the annular space between said casing and the cylinder, and said outer casing also having an opening, in its under side through which the seed material is discharged after travelling up, over, and around down through said annular space, said cylinder being revolved in the direction of travel of the seed material.

4. A seed harvester air-blast release device comprising an outer perforate casing, a perforate cylinder carried within the outer casing whereby there is an appreciable annular space between the said casing and cylinder, said outer casing having an opening through which seed-bearing material may be directed into the annular space, and from which opening the seed-bearing material may be discharged after passing an appreciable distance around the cylinder, a deflecting member across said opening, said deflecting member dividing said opening so that the streams of incoming and discharging material are prevented from intermingling.

5. A seed harvester air-blast release device comprising an outer perforate casing, a perforate revolvable cylinder carried within the casing whereby there is an appreciable annular space between said casing and said cylinder, said outer casing having an opening through which a stream of seed-bearing material may be directed into the annular space tangentially of the cylinder and from which opening the stream of seed-bearing material may discharge after passing an appreciable distance around the cylinder, a revolving deflector across the opening positioned and revolved to direct the incoming stream toward the annular space and to direct the discharging stream away from the cylinder and from the incoming stream.

In testimony whereof I